Nov. 29, 1960     A. A. AYKANIAN     2,962,407
METHOD FOR PREPARING LAMINATED FOAM STRUCTURES
Filed Nov. 7, 1955     3 Sheets-Sheet 1
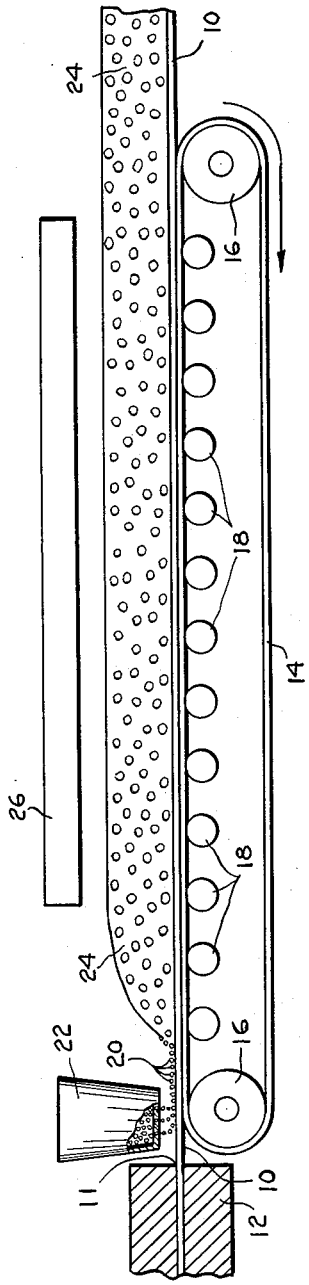
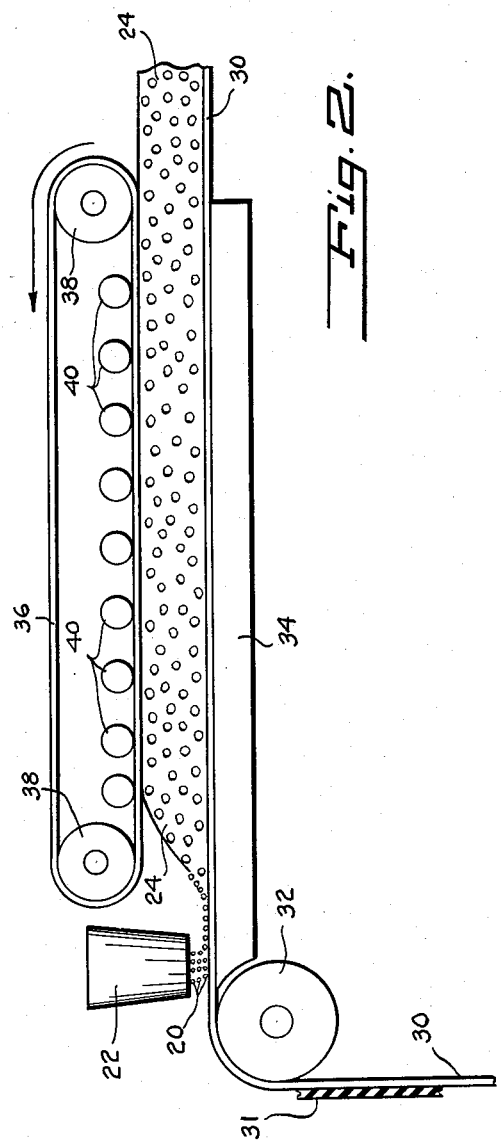
INVENTOR
ARDASHUS A. AYKANIAN
BY
*Richard F. Kelly*
ATTORNEY.

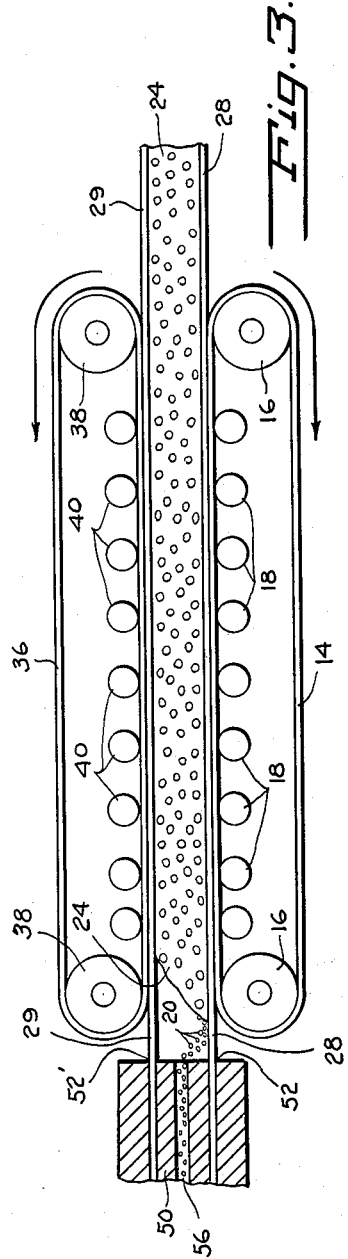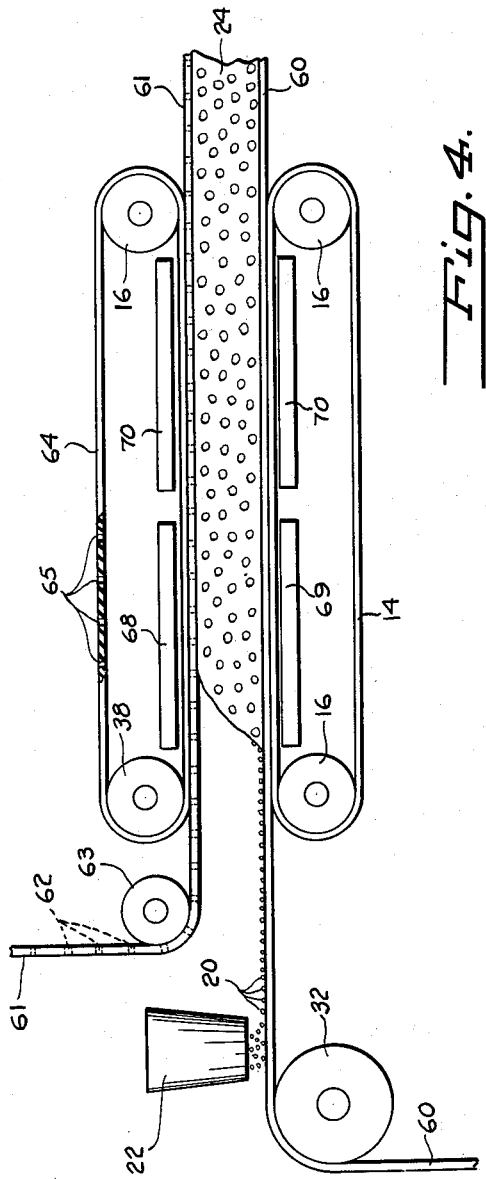

Nov. 29, 1960  A. A. AYKANIAN  2,962,407
METHOD FOR PREPARING LAMINATED FOAM STRUCTURES
Filed Nov. 7, 1955  3 Sheets-Sheet 3

INVENTOR
ARDASHUS A. AYKANIAN

BY
ATTORNEY.

United States Patent Office 2,962,407
Patented Nov. 29, 1960

2,962,407

METHOD FOR PREPARING LAMINATED FOAM STRUCTURES

Ardashus A. Aykanian, Indian Orchard, Mass., assignor to Monsanto Chemical Company, St. Louis, Mo., a corporation of Delaware Filed Nov. 7, 1955, Ser. No. 545,346

4 Claims. (Cl. 154—100)

The present invention relates to improved methods for preparing laminated resin foam structures and more particularly to methods for preparing resin foam sheets having a covering material laminated thereto.

Resin foams such as foamed polystyrene, foamed phenolformaldelhyde resins, etc., are low density materials having high strength/weight ratios and excellent thermal and electrical insulating properties. Laminated resin foam structures comprising a resin foam having one or a plurality of sheets of covering material laminated thereto are highly useful in the fabrication of refrigerator panels, light-weight shipping containers, display racks, novelties, etc. The methods heretofore employed for preparing such laminated resin foam structures have been relatively inefficient. In general, the resin foam is cut to the desired shape from a large block or cylinder of resin foam and the sheets of covering material are applied to the cut resin foam with liquid adhesives such as glue. To reduce costs and broaden the market for such laminated resin foam structures it would be desirable to have more efficient manufacturing processes and particularly to have continuous manufacturing processes for preparing such laminated structures directly from beads or granules of a foamable resin composition.

Accordingly, it is an object of this invention to provide improved methods for preparing laminated resin foam structures.

Another object of this invention is to provide continuous methods for preparing laminated resin foam structures.

Figure 5:
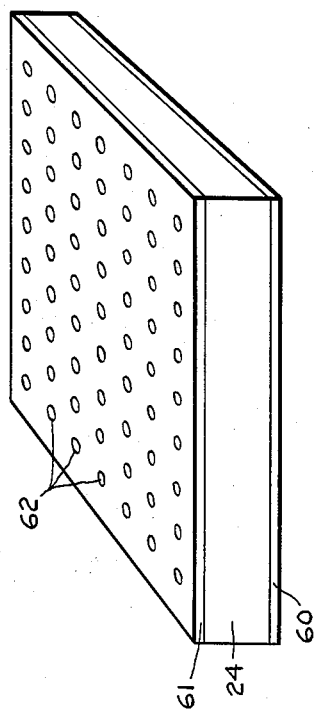
Figure 6:
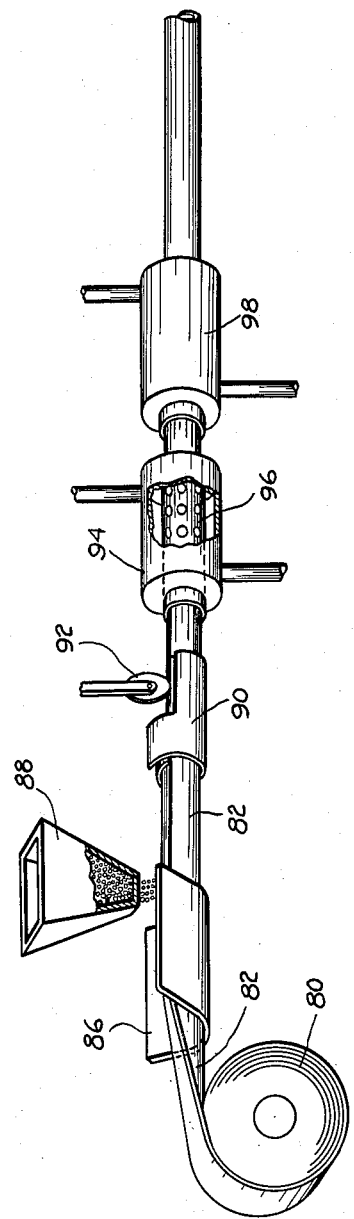

Other objects and advantages of this invention will become apparent from the following detailed description thereof when read in conjunction with the accompanying drawings in which Fig. 1 is a side elevation view partially in section of one embodiment of the invention in which a resin foam is laminated to a sheet of thermoplastic resin, Fig. 2 is a side elevation view partially in section of another embodiment of the invention in which a resin foam is laminated to a sheet of metal foil and in which means are included to provide a structure of closely controlled thickness, Fig. 3 is a side elevation view partially in section of an embodiment of the invention in which a sandwich structure is provided by laminating thermoplastic sheets to both sides of a sheet of resin foam, Fig. 4 is a side elevation view partially in section of an embodiment of the invention in which sheets of paper are laminated to both sides of a sheet of resin foam, Fig. 5 is a perspective end view of the laminated structure produced by the method illustrated in Fig. 4, and Fig. 6 is a perspective view of an embodiment of the invention in which the laminated resin foam is prepared in the shape of a rod.

An efficient method for preparing laminated resin foam structures has been discovered. In this method, a foamable resin composition is deposited on a sheet of covering material and heated to foam the resin. In one embodiment of the invention, the foamable resin composition is deposited on a hot sheet of covering material and the sensible heat of the covering sheet foams the resin. In another embodiment of the invention (1) a foamable resin composition is encased in a covering material adapted to define the profile of the laminated structure, (2) the encased foamable resin composition is placed in a profile defining die and (3) the encased foamable resin composition is contacted with steam so as to foam the foamable resin composition into pressured contact with the faces of the profile defining die.

In the embodiment of the invention illustrated in Fig. 1, a sheet of thermoplastic resin 10, e.g., polystyrene, is extruded from an orifice 11 of sheet forming die 12 onto an endless belt 14 which is driven by drive rolls 16 and supported by load-carrying rolls 18. Beads of foamable resin 20, e.g., polystyrene containing 1–10% pentane, are metered onto sheet 10 from a hopper 22. The sensible heat of thermoplastic sheet 10, which may be extruded at temperatures of the order of 225° C., expands foamable resin beads 20 into a mass of resin foam 24. A bank of infrared heaters 26 is provided to supplement the sensible heat of sheet 10 in foaming the resin beads.

Fig. 2 illustrates a process that is particularly adapted to laminating a sheet of metal foil to a resin foam. A sheet of covering material 30, e.g., aluminum foil which has one surface coated with a rubber-base adhesive 31 (shown only fragmentarily and in exaggerated thickness), is heated above the foaming temperature of the foamable resin beads to be employed and is drawn over heated roll 32 and heated platen 34. Foamable resin beads 20, e.g., polystyrene containing 1–10% pentane, are metered from hopper 22 onto the adhesive coated surface of sheet 30. The sensible heat of sheet 30, supplemented with the heat transferred therethrough from heated roll 32 and heated platen 34, foams beads 20 into a mass of resin foam 24. An endless belt 36, which is driven under rolls 40 by drive rolls 38, is included to limit the expansion of resin foam 24 and provide a laminated resin foam structure of accurately dimensioned thickness.

Fig. 3 illustrates an embodiment of the iinvention in which a sandwich structure is prepared by laminating thermoplastic sheets to both sides of a sheet of resin foam. Thermoplastic sheets 28 and 29 are extruded from orifices 52 and 52' of a double-sheet forming die 50. Foamable resin beads 20, e.g., polystyrene containing 1–10% pentane, are blown into the cavity formed between sheets 28 and 29 through a central channel 56 provided in sheet-forming die 50. The sensible heat of sheets 28 and 29 foams resin beads 20 into a mass of resin foam 24. Endles belts 14 and 36 are provided to limit the expansion of resin foam 24 and provide a sandwich structure of accurately dimensioned thickness. Belts 14 and 36 may be heated by conventional means where supplementary heat is required to foam the foamable resin beads 20.

Fig. 4 illustrates a method for laminating sheets of paper to both sides of a resin foam sheet. A sheet of paper 60 is drawn over roll 32 onto endless belt 14 which is driven by rolls 16. A second sheet of paper 61 containing perforations 62 is drawn over roll 63 onto an endless belt 64 which is driven by drive rolls 38. Perforations 65 are provided throughout belt 64 but are shown only fragmentarily in the drawing. Foamable resin beads 20, e.g., polystyrene containing 1–10% pentane, are deposited from a hopper 22 onto the moving sheet of paper 60. Steam from chest 68 passes through the perforations of endless belt 64 and paper 61 and contacts foamable resin beads 20 thereby foaming same into a sheet of resin foam 24 which forces paper sheets 60 and 61 into pressured contact with endless belts 14 and 64 which together constitute a sheet-defining die. A heated platen 69 is provided on the underside of endless belt 14 to supply heat and assist in foaming the foamable resin beads 20. Cooling platens 70 are provided on the down-stream side of steam chest 68 to cool the laminated assembly below the resin foaming temperature before it leaves pressured engagement with endless belts 14 and 64.

Fig. 5 is a perspective view of the laminated sheet produced by the process described in Fig. 4.

In Figs. 1, 2, 3 and 4, each of the endless belts is provided with elevated side guides (not shown) which prevent the foamable resin beads from being thrown off the moving sheet of covering material. In Figs. 2, 3 and 4, these side guides also seal the locus of the foaming so that slight pressure may be built up by the foaming resin.

Fig. 6 illustrates the preparation of a paper covered resin foam rod by the method of this invention. A sheet of paper 82 containing small perforations (not shown) is drawn from roll 80 and is passed through a bowl-shaped forming member 86 which shapes paper 82 into a trough. Foamable resin beads, e.g., polystyrene containing 1-10% pentane, are fed from a hopper 88 into the trough-shaped sheet of paper 82. The paper trough containing the foamable resin beads is passed through tube-forming and sealing means 90 and 92, respectively, (only partially shown) which roll the paper sheet into a cylindrical tube and seal same. The perforated paper tube containing the foamable resin beads next passes through a steam chamber 94 having a perforated inner liner 96, which also functions as the rod-defining die. Steam contacts the foamable resin beads and foams same into a voluminous plastic mass which forces the tube of paper 82 into pressured contact with the cylindrical liner 96. The paper covered resin foam rod then is passed through a cooling die 98 and is delivered to further processing operations or to a cutting station.

Essentially any foamable thermoplastic resin composition can be employed in the process of this invention. Such foamable resin compositions consist of a predominant proportion of resin and a small proportion of a foaming or blowing agent. The foamable resin composition should be deposited on the sheet of covering material in the form of small discrete particles or beads. In many cases such beads or granules will be partially foamed before they are employed in the present process.

Examples of resins that may be employed include thermoplastic resins such as the cellulose ethers and esters, e.g., ethyl cellulose, cellulose acetate, cellulose nitrate, cellulose butyrate; homopolymers and interpolymers derived from monomers containing the vinylidene group $CH_2=C<$ such as vinyl halides, e.g., vinyl chloride, vinyl bromide; vinylidine chloride; olefins, e.g., ethylene, isobutylene; vinyl esters of carboxylic acids, e.g., vinyl acetate, vinyl propionate, vinyl benzoate; vinyl ethers, e.g., vinyl methyl ether, vinyl isobutyl ether; unsaturated carboxylic acids and derivatives thereof, e.g., acrylic acid, methacrylic acid, acrylic acid esters, methacrylic acid esters, acrylamide, acrylonitrile; vinyl aromatic compounds, e.g., styrene, vinyl toluene, p-ethylstyrene, 2,4-dimethylstyrene, o-chlorostyrene, 2,5-dichlorostyrene, vinyl naphthalene and interpolymers of vinylidene monomers of the above type and alpha, beta-unsaturated polycarboxylic acids and derivatives thereof, e.g., maleic anhydride, diethyl maleate, dibutyl fumarate, etc. It is feasible and sometimes desirable to employ blends of two or more thermoplastic resins, such as, e.g., blends of polystyrene with rubbery diene polymers such as natural rubber, butadiene-styrene interpolymers, butadiene-acrylonitrile interpolymers and the like. High impact polystyrene prepared by polymerizing monomeric styrene in the presence of a rubbery diene polymer also may be employed advantageously.

Suitable foaming agents for the foamable resin compositions are well known in the art and the selection of the particular foaming agent to be employed will be dictated largely by the particular resin in which it is to be incorporated. See U.S. 2,681,321.

A preferred foamable resin composition for use in the present invention comprises polystyrene having incorporated therein as a foaming agent a volatile, nonreactive organic liquid which has only a slight solvent action on the polystyrene. Examples of suitable foaming agents for this system include pentane, hexane, heptane, petroleum ether, cyclopentane, cyclopentadiene, acetone, methanol, methyl acetate, ethyl acetate, methyl formate, ethyl formate, dichlorethylene, isopropyl chloride, propionaldehyde and diisopropyl ether.

Coloring agents, pigments, light and heat stabilizers, lubricants and other plastic compounding agents may be included in the foamable resin compositions. Such compounding agents also may be included in thermoplastic sheets, where such thermoplastic sheets are employed as the covering material for the resin foam.

In the broadest embodiment of the invention, essentially any covering material may be employed in the preparation of the laminated resin foam structures. Examples of such covering materials include plastic sheets, metal foils, leather, sheets of thin wood veneers, etc. In the embodiment of the invention illustrated by Figs. 1, 2 and 3, wherein the heat required to foam the resin beads is supplied in part at least by the sensible heat of the covering material, it is necessary to employ covering materials that can be heated to relatively high temperatures, e.g., 200° C. or higher. The prime examples of covering materials that are suitable for use in this embodiment are metal foils and sheets of thermoplastic resins. Among the metal foils copper and aluminum are the most suitable, although foils prepared from other metals such as steel, brass, etc. also may be used. Suitable sheets of thermoplastic resin may be fabricated from a wide variety of resins such as cellulose acetate, homopolymers and interpolymers of vinyl chloride, homopolymers and interpolymers of styrene and the like.

In many cases, strong adhesive bonds can be obtained between the resin foam and covering material without the use of adhesives. For example, strong bonds usually can be obtained between a paper covering material and virtually any resin foam without the use of adhesives. When thermoplastic sheets are employed as the covering material, good bonds can be obtained without adhesives when the resin foam and the thermoplastic sheet are chemically similar, e.g., when laminating foamed polystyrene to polystyrene sheets or foamed polyvinyl chloride to polyvinyl chloride sheets. Where other types of covering materials are used or where the thermoplastic sheet and the resin foam are chemically dissimilar, it may be necessary to employ adhesives to obtain strong bonds between the laminated surfaces. No particular difficulty is encountered in finding suitable adhesives and the selection of the particular adhesive to be employed will be governed largely by the chemical nature of the covering material and the resin foam.

The heat required to foam the foamable resin can be supplied in many ways. In the embodiment of the invention illustrated by Figs. 1, 2 and 3, all or a substantial portion of the required heat is supplied by the sensible heat contained within the sheet of the covering material. This heat is supplied simply by heating the covering material to a high temperature of the order of 200° C. or higher immediately prior to depositing the foamable resin composition on the covering material. In other embodiments of the invention, the heat required to foam the foamable resin composition can be supplied by other conventional heating means such as infrared heaters, high-frequency induction heaters, conventional heating ovens, etc.

In some cases, it is desirable and/or expedient to supply the heat to foam the foamable resin composition in two or more steps. In the first step, the foamable resin composition may be partially foamed and a strong adherent bond formed between the resin foam and the covering material. In the second and/or subsequent steps, the foamable resin composition is foamed further to provide a laminated structure having a lower specific gravity. As an illustration of this method, a foamable resin composition can be deposited upon a hot extruded sheet of thermoplastic resin and partially foamed by the sensible heat thereof. The resin foam then may be further expanded by passing the laminated structure through a hot-water bath or through a heating oven.

In the embodiment of the invention illustrated in Figs. 4 and 6, the heat required to foam the foamable resin composition is supplied by directly contacting the foamable resin composition with steam. As illustrated in Figs. 4 and 6, the steam may be supplied from an external source in which event at least a portion of the covering material must be perforated to permit the steam to pass through the covering material and contact the foamable resin composition. Where perforation of the covering material is not objectionable, this is the preferred method for carrying out this embodiment of the invention. This embodiment is not restricted to the above mode of contacting the foamable resin composition with steam, however, and the required steam may be obtained by incorporating water or a water-progenitor in either the foamable resin composition or the covering material and heating the encased structure to generate steam in situ.

Where the covering material employed is of a bibulous nature such as paper, the water required to generate the steam in situ can be supplied by simply saturating the covering material with water. Where the desired exterior covering material is not bibulous, e.g., plastic sheets, metal foil and the like, the same technique may be employed by substituting for the original covering material a two-ply covering material consisting of an inner ply of a bibulous material and an outer ply of the desired exterior covering material.

In another variation of this embodiment of the invention, the necessary steam may be generated in situ from water that is incorporated with the foamable resin composition. In the simplest case, the water may be incorporated in the resin beads by admixing the beads with a finely divided, water-saturated, bibulous material. Alternatively, the water may be supplied by admixing the foamable resin composition with hydrated salts which decompose below the foaming temperature employed to liberate free water. Examples of salts that may be employed for this purpose include sodium sulfate decahydrate and sodium thiosulfate pentahydrate.

In the embodiment of the invention illustrated by Figs. 2, 3 and 4, the sheet of covering material carrying the foamable resin composition is moved under a second substantially parallel surface which is moved in the same direction as the sheet of covering material, e.g., an endless belt. Side guides which project from the surface of the covering material to the second substantially parallel surface also are provided. The combination of the covering material, the second substantially parallel surface and the side guides define an elongated channel which is open only at the two ends and which functions as a die to define the profile of the laminated structure. When the foamable resin composition foams within this elongated channel, the pressure generated by the foaming or blowing agent may build up to a level materially above atmospheric pressure. The laminates prepared by this embodiment of the invention, in general, have superior physical properties and stronger adhesive bonds between the resin foam and the covering material.

The above descriptions and particularly the drawings and examples are set forth by way of illustration only.

It will be obvious to those skilled in the art that many modifications and variations thereof can be made without departing from the spirit and scope of the invention therein described.

What is claimed is:

1. A continuous method for preparing laminated resin foam structures which comprises encasing a multitude of small particles of a foamable resin composition in a covering material adapted to define the profile of the laminated structure, at least a portion of said covering material being perforated, transporting the encased foamable resin composition through a profile-defining die, contacting the perforated section of the covering material with steam within the profile-defining die and foaming the encased foamable resin composition into pressured contact with the profile-defining die; said foamable resin composition comprising discrete particles of a thermoplastic resin having incorporated therein a nonreactive organic liquid which volatilizes below the softening point of the thermoplastic resin and which has at most a slight solvent action on the thermoplastic resin; the foamable resin particles being distributed substantially uniformly throughout the covering material and in a quantity such that the resin composition, when foamed, will substantially completely fill the profile-defining die; the foam-contacting surface of the covering material being adhesive to the resin foam.

2. The method of claim 1 in which the covering material is paper.

3. A continuous method for preparing a laminated resin foam rod which comprises encasing a multitude of small particles of a foamable resin composition in a cylindrical tube of covering material, at least a portion of said cylindrical tube being perforated, transporting the encased foamable resin composition through a cylindrical profile-defining die, contacting the perforated section of the cylindrical tube with steam within the profile-defining die and foaming the encased foamable resin composition into presured contact with the profile-defining die; said foamable resin composition comprising discrete particles of a thermoplastic resin having incorporated therein a nonreactive organic liquid which volatilizes below the softening point of the thermoplastic resin and which has at most a slight solvent action on the thermoplastic resin; the foamable resin particles being distributed substantially uniformly throughout the covering material and in a quantity such that the resin composition, when foamed, will substantially completely fill the profile-defining die; the foam-contacting surface of the covering material being adhesive to the resin foam.

4. A continuous method for preparing a laminated resin foam sheet which comprises (1) continuously moving two flat substantially parallel sheets of covering material, at least one of which is perforated, through a die defined by two flat substantially parallel surfaces, (2) providing a pair of elongated substantially parallel side guides which project from the first of said parallel surfaces to the second of said parallel surfaces, said parallel surfaces and side guides defining an elongated open-ended chamber, (3) depositing a multitude of small particles of a foamable resin composition substantially uniformly over the surface of the bottom covering sheet and in a quantity such that the foamable resin composition, when foamed, will substantially completely fill the elongated open-ended chamber, and, (4) contacting the perforated sheet of covering material with steam within the elongated open-ended chamber and foaming the encased foamable resin composition into pressured contact with the two parallel surfaces and the side guides; said foamable resin composition comprising discrete particles of a thermoplastic resin having incorporated therein a nonreactive organic liquid which volatilizes below the softening point of the thermoplastic resin and which has at most a slight solvent action on the thermoplastic resin;

the foam-contacting surface of the covering material being adhesive to the resin foam.

References Cited in the file of this patent

UNITED STATES PATENTS

| | | |
|---|---|---|
| 1,943,101 | Wheatley | Jan. 9, 1934 |
| 2,141,405 | Randall | Dec. 27, 1938 |
| 2,271,058 | Binns | Jan. 27, 1942 |
| 2,649,391 | Alderfer | Aug. 18, 1953 |
| 2,668,987 | Harris et al. | Feb. 16, 1954 |
| 2,686,747 | Wurtz | Aug. 17, 1954 |
| 2,716,778 | Beare | Sept. 6, 1954 |
| 2,744,291 | Stastry et al. | May 8, 1956 |
| 2,745,141 | Brennan | May 15, 1956 |
| 2,770,406 | Lane | Nov. 13, 1956 |
| 2,774,120 | Beare | Dec. 18, 1956 |
| 2,787,809 | Stastny | Apr. 9, 1957 |
| 2,866,730 | Potchen et al. | Dec. 30, 1958 |
| 2,872,965 | Sisson | Feb. 10, 1959 |

FOREIGN PATENTS

| | | |
|---|---|---|
| 842,267 | Germany | Sept. 15, 1952 |
| 716,847 | Great Britain | Oct. 13, 1954 |